March 2, 1943. R. J. CAUGHEY 2,312,958
WIDE RANGE TURBINE GOVERNING ARRANGEMENT
Filed Oct. 25, 1939
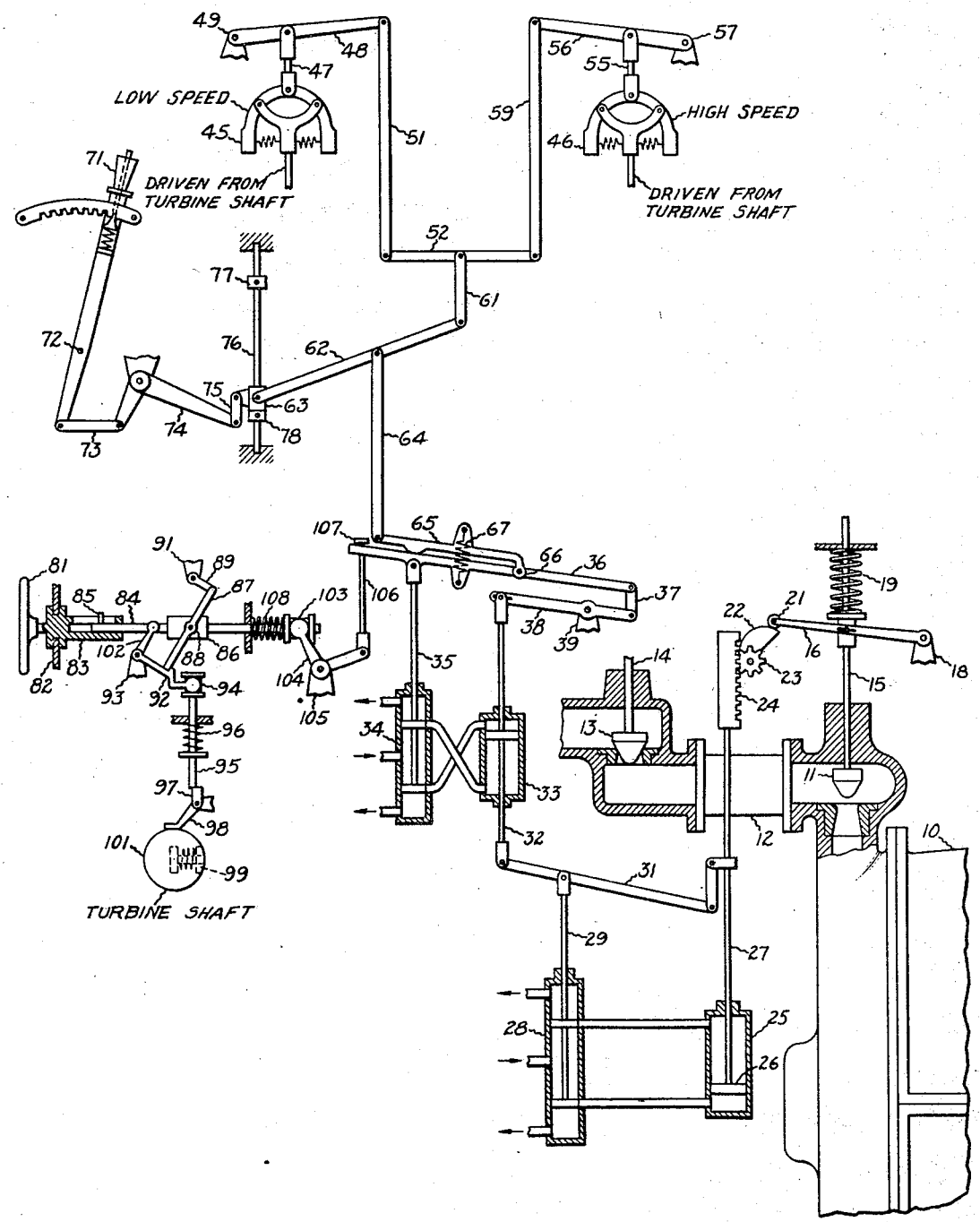
Inventor:
Reed J. Caughey.
by Harry E. Dunham
His Attorney.

Patented Mar. 2, 1943

2,312,958

UNITED STATES PATENT OFFICE 2,312,958

WIDE RANGE TURBINE GOVERNING ARRANGEMENT

Reed J. Caughey, Schenectady, N. Y., assignor to General Electric Company, a corporation of New York Application October 25, 1939, Serial No. 301,220

3 Claims. (Cl. 264—3)

The present invention relates to speed governing mechanisms for controlling prime movers, especially elastic fluid turbines having inlet valve means to be positioned in response to speed changes. Such mechanisms usually include a speed responsive device driven or operated from the prime mover shaft and connected to the element or elements to be controlled through the intermediary of a hydraulic motor and a relay. Difficulty is experienced whenever accurate control of speed is required over a wide range, particularly if the speed responsive device is in the form of a centrifugal type governor. Such centrifugal governors permit accurate control within a speed range of the order of 1:5, for example, where the prime mover speed varies within a speed range of from 440 to 2200 R. P. M. Beyond such speed range as, for example, of the order of 1:10, the ordinary centrifugal type of flyball governor does not give accurate control because the power of the governor, which varies as the square of the speed, becomes insufficient to attain sensitive regulation.

It is an object of my invention to provide a new and improved control mechanism for a prime mover whereby accurate speed control may be obtained within an extremely wide range of speed change.

It is a further object of my invention to provide a new and improved elastic fluid turbine governing arrangement and adjusting means therefor whereby accurate speed control may be obtained for any predetermined setting within an extremely wide range of speed change.

A still further object of the invention is to provide a new and improved prime mover speed control mechanism embodying a plurality of speed responsive devices sensitive to different speed ranges which may be adjusted sequentially to assume control of the prime mover in the order of their ranges of sensitivity.

And a further object of the invention is to provide a new and improved prime mover speed control mechanism embodying a plurality of speed responsive devices arranged in such a cooperative manner whereby smooth and accurate control of the prime mover speed may be obtained for any predetermined speed within a range greater than the operative limits of any one of such devices.

In the illustrated embodiment of my invention a pair of similar speed governors are provided, one for controlling the admission of elastic fluid to the turbine during the lower portion of the total speed range, the other controlling the flow of elastic fluid to the turbine through the upper portion of the total speed range, the two governors being connected together so that the speed control is automatically transferred from one to the other in a smooth and even manner. Control means are provided in the linkage system between the governors and the valve operating apparatus whereby the governing mechanism may be adjusted to maintain the speed of the elastic fluid turbine at any predetermined constant value within the range of either governor.

For a consideration of what I believe to be novel and my invention, attention is directed to the following description and the claims appended thereto taken in connection with the accompanying drawing.

The single figure of the drawing is a schematic illustration of a governor control mechanism for a prime mover in accordance with one form of my invention.

The prime mover in the present instance is shown as an elastic fluid turbine 10 having an inlet valve 11 for controlling the flow of elastic fluid thereto. Arranged in the elastic fluid supply conduit 12 ahead of the control valve 11 is a stop valve 13 of any suitable type well known in the art which may be controlled by operating means connected to the stem 14 thereof. The control valve 11 is provided with a stem 15 the upper end of which is connected to the operating bar 16 pivoted at one end to a stationary part 18. The operating bar 16 is biased in the counter-clockwise direction, and hence the control valve 11 to the closed position, by means of the suitably arranged spring 19. The left end of the operating bar is provided with a roller 21 which is adapted to be engaged by a lifting cam 22. The cam is driven through gear 23 and the cooperating rack bar 24 by the hydraulic operating motor 25, piston 26 of the motor being connected to the rack bar by stem 27. The supply of operating fluid to the hydraulic motor is controlled by a suitable pilot valve 28 in accordance with impulses transmitted to the stem 29 in a manner well known in the art. The pilot valve stem 29 is pivotally connected to an intermediate point of a floating lever 31, one end of which lever is connected to the motor stem 27 and the other end to the stem 32 of the speed relay servo motor 33. The supply of operating fluid to the motor 33 is controlled by the speed relay pilot valve 34, the stem 35 of which is connected for adjustment by the floating lever 36. One end of the floating lever 36 is pivotally connected by link 37 to one end of the lever 38 which is pivotally mounted intermediate its end upon a stationary support 39, the other end of lever 38 being pivotally connected to the stem 32 of the speed relay motor 33. The floating lever 36 is adapted for adjustment either by manual control means, as during starting of the prime mover, or by adjustable speed governing means when the prime mover is in normal running operation.

The speed governing means comprises two speed responsive devices 45 and 46, illustrated as being of the centrifugal or flyball type governors, the devices being responsive to continuous and substantially non-overlapping ranges of prime mover speed. One of these, for example, the device 45, is a low range speed governor so designed and adjusted that its weights start to move outwardly at about 12 to 15 per cent of normal prime mover speed, and reach their outermost position at approximately 50 per cent of normal prime mover speed. The second governor 446 is so designed and adjusted that its weights begin to move outwardly just as the weight of the low range speed governors reach their outer limit and have an operating range of from 50 to approximately 105 per cent of normal prime mover speed. The two governors 45 and 46 may be similar devices and may be driven from the prime mover shaft with different gear ratios so that the low range governor 45 will be operated at the same speed when the turbine is operating at half speed as the high speed range governor 46 operates when the turbine is running at full speed. The governor 45 is connected by link 447 to a beam 48 which is pivotally supported as at 49 to a stationary part. The free end of the beam 48 is connected by link 51 to one end of the floating lever 52. The governor 46 is connected by link 55 to the beam 56 which is pivotally supported as at 57 to a stationary part, the free end of the beam 56 being connected by link 59 to the other end of the floating lever 52. An intermediate point of the lever 52 is connected by link 61 to the right end of lever 62, the left end of which lever is pivotally connected to the adjustable sleeve 63. The lever 62 is pivotally connected intermediate its ends by link 64 to the floating lever part 65, the part 65 being pivotally connected as at 66 to the floating lever 36 and is normally biased for movement with the lever 36 by means of the iterconnecting spring 67. By the leverage arrangement as indicated only a small increment of total governor travel is required to cause movement of the piston of speed relay motor 33 through its full stroke. It is to be understood that a full stroke movement of the relay motor 33 will effect through the pilot valve 28 a full stroke movement of the control valve operating servo motor 25 and hence, also cause movement of the control valve 11 throughout its full stroke.

For selectively determining the particular speed of the prime mover which is to be maintained by the governor, a hand lever 71 is provided pivotally mounted as at 72 and connected by link 73, bellcrank 74, and link 75 to the sleeve 63 which is slidably arranged on the guide rod 76 between stops 77 and 78. For minimum speed the sleeve 63 is adjusted against the lower stop 78 and for maximum speed against the upper stop 77, while for intermediate speeds the sleeve 63 may be held in various intermediate positions upon the rod 76. By thus varying the pivotal support for the end of the lever 62, the governor system may be adjusted whereby the speed relay will be controlled with any selected portion of the governor stroke.

An additional control mechanism is provided for the relay operating lever 36 whereby the main valve 11 may be actuated to closed and opened positions independently of the governor devices. By this mechanism, the prime mover is started up from standstill and during normal operation, the prime mover control is taken over automatically by the governors as the speed thereof approaches that for which the governors are set. Emergency tripping means are associated with this control mechanism whereby the main valve is actuated to the closed condition upon an excess prime mover speed. This control mechanism comprises a hand wheel 81 rotatably mounted within a stationary part 82 and provided with a slotted sleeve 83 for cooperatively receiving an end of the longitudinally movable screw 84. The end of the screw is provided with a pin 85 projecting into the slot of the sleeve so that the screw will be rotated by operation of the hand wheel. Cooperatively threaded upon the screw is a sleeve 86 which sleeve is adapted to be restrained against rotational movement with the screw 84 by a lever 87 pivotally connected thereto at 88. The upper end of the lever 87 is connected by the link 89 to a stationary part 91 while the lower end of the lever 87 is normally restrained by an emergency trip latch 92 which is pivoted to a stationary part 93. The latch is pivotally connected at 94 to an operating plunger 95, biased downwardly by spring 96, the lower end of which plunger rests upon a stop portion 97 of a releasing trigger 98. The trigger 98 is adapted to be engaged at a predetermined excess prime mover speed by a governor device 99 of a well known form imbedded within the prime mover shaft 101. For resetting the emergency tripping device, the latch 92 is provided with an arm 102, the end of which extends upwardly adjacent the screw 84 and is adapted to be engaged and reset by the end of the sleeve 86 as it is moved to the extreme left along the screw. The outer end of the screw 84 is pivotally connected at 103 to one arm of a bellcrank 104 which bellcrank is pivoted upon a stationary support 105. The other bellcrank arm is connected to a stem 106 which extends through a cooperating opening in the end of the floating lever 36. The end of the stem 106 is provided with a stop 107 for positioning the floating lever 36 in accordance with the condition of adjustment of the hand wheel 81. The screw 84 is biased toward the right by a suitably arranged compression spring 108.

The operation of the control mechanism will now be described. Considering that the prime mover 10 is at standstill, the apparatus will be substantially in the relative condition of adjustment as illustrated. The control valve 11 will be in the fully opened position due to the deenergized condition of the governors 45 and 46 while the supply of operating fluid to the prime mover will be cut off due to the closed condition of the stop valve 13. The hand wheel 81 will first be rotated in the clockwise direction whereupon the screw 84 will be moved to the right through the sleeve 86 under the force of the compression spring 108. The bellcrank 104 will be rotated in the clockwise direction and the stop 107 engaging with the floating lever 36 will rotate it in the counterclockwise direction against the force of the spring 67. The relay pilot valve stem 35 will be moved downwardly, so as to admit operating fluid to the upper surface of the piston of the speed relay servo motor 33 causing it to move downwardly to its lowermost position. Lever 38 will be rotated in the counterclockwise direction, and the right end of the lever 36 will be lifted to reclose the pilot valve 34. The stem 29 of the main pilot valve 28 will also be forced downwardly, so as to admit operating fluid to the lower surface of the piston of the main servo motor 25, whereupon the stem 27 will be forced upwardly. The cam 22 will be rotated in the clockwise direction, thereby allowing the control valve 11 to be moved to the fully closed position under the force of the biasing spring 19. Further movement of the hand wheel 81 in the clockwise direction after the closure of the control valve 11 will cause the sleeve 86 to travel to the left along the screw 84. The end of the sleeve 86 will engage with the latch arm 102 to effect the resetting of the emergency trip mechanism in the event that it had been previously tripped, or if not, to merely check that the trip mechanism is in the set condition. The stop valve 13 may now be opened by its operating means. The control valve 11 may be moved slowly in the opening direction for admitting steam to the turbine by rotating the hand wheel 81 in the counterclockwise direction. Upon such rotation the sleeve 86 will first advance along the screw 84 toward the right until the lower end of the lever 87 engages with the stop on the latch arm 92. Further counterclockwise rotation of the hand wheel 81 and screw 84 causes the screw to move to the left against spring 108, thereby rotating the bellcrank 104 in the counterclockwise direction. As stem 106 moves upwardly, the end of the floating lever 36 will follow stop 107 under the force of the tensioned spring 67. This movement of the floating lever 36 will result in an upward movement of the pilot valve stem 35 to admit operating fluid to the lower surface of the piston of the speed relay motor 33. The stem 29 of the main pilot valve 28 will be moved upwardly so as to admit operating fluid to the upper surface of the piston 26 of the main servo motor 25. As the stem 27 and rack bar 24 move downwardly, the cam 22 will be rotated in the counterclockwise direction so as to move the control valve 11 slightly to the opened position corresponding to the adjustment of the hand wheel 81.

At about 12 to 15 per cent normal speed of the prime mover, the lever 71 being in the low speed position, the floating lever 36 will engage with the lever 65 and the low range speed governor 45 will assume the control of the machine. The hand wheel 81 may then be further rotated to its extreme position so as to move the stop 107 beyond the range of normal movement of the floating lever 36.

In the position indicated in the drawing the hand lever 71 is set for the minimum speed condition holding sleeve 63 against the lower stop 78. At this condition of adjustment the low speed range governor 45 will come into operation to maintain a corresponding speed of the prime mover. Any tendency of the prime mover to race beyond this speed will result in an outward movement of the weights of the governor 45, a downward movement of the stems 51, 61, 64, and a counterclockwise movement of the floating lever 36 which, as described above, effects a closing movement of the control valve 11.

By movement of the handle of control lever 71 to the left, the sleeve 63 is raised upwardly upon the rod 76, thereby effecting an increase of the prime mover speed by a movement of the stem 64 in the upward direction. Simultaneously the governor 45 will effect a corresponding movement of the link 61 in the downward direction in accordance with the increase of turbine speed. The governor will thereupon maintain the particular speed for which lever 71 is set. Thus it will be noted that upon movement of the control lever 71 to any predetermined position, a corresponding adjustment of the speed governors is obtained. When the lever 71 is adjusted to such a prime mover speed position that the low speed range governor 45 moves to its fully opened position, the weights of the high speed range governor 46 will begin to move outwardly to assume the control of the prime mover. During operation of the high speed governor the weights of the low speed governor remain in their outer end positions. Outward movement of the fly-weights of the governor 46 and the resultant counterclockwise movement of the beam 56 will be accompanied by a downward movement of the link 59 which through the floating lever 52 will effect a downward movement of the stem 61 which in turn effects the adjustment of the control valve 11 in a manner similar to the described operation for the low speed range governor 45.

It will be noted that the hand wheel 81 may be utilized as a load limit control means for the prime mover as well as for a starting control. As stated, during the normal running operation of the turbine, the hand wheel is turned until the stop 107 is in its uppermost position and beyond the limits of movement of the end of the floating lever 36. By rotating the hand wheel in the reverse direction a predetermined amount, the left end of the lever 36 may be pulled down to any desired position which will definitely limit the opening movement of the control valve 11. Any effort exerted by the governors 45 or 46 to open the control valve further will merely result in the splitting of the lever 65 from the floating lever 36 against the tension of spring 67.

Summarizing, a governing system according to my invention comprises a plurality of devices responsive to consecutive non-overlapping ranges of an operating condition such as the speed of a machine to be controlled. An element of such machine to be controlled in response to changes of speed or like operating condition is connected to these devices by means including a link and lever mechanism. The latter has a leverage sufficient to effect movement of the element through its entire operating range in response to a partial stroke of any of such devices. In case these devices are in the form of speed governors each governor has an operating range or stroke consisting of a plurality of consecutive parts or partial strokes and the movement of any governor through any one of such consecutive parts effects with the aforementioned leverage of the link and lever mechanism movement of the controlled element through its entire operating range. The particular speed or like operating condition is controlled by means for adjusting the link and lever mechanism selectively to determine any of the partial strokes or increments of any one of the speed governors, thereby effecting operation of such governor within a predetermined part of its operating range.

Having described the principle of operation of my invention together with the apparatus which I now consider to represent the best embodiments thereof, I desire to have it understood that the arrangement shown is merely illustrative and that the invention may be carried out by other means.

What I claim as new and desire to secure by Letters Patent of the United States is:

1. Governing system comprising a plurality of devices responsive to consecutive non-overlapping ranges of an operating condition of a machine, each device having a stroke consisting of a plurality of partial strokes, an element to be controlled in response to changes of such operating condition, means for connecting the devices to the element, said means including a link and lever mechanism with a leverage sufficient to effect movement of the element through its entire operating range in response to a partial stroke of any one of said devices, and means for adjusting the mechanism to select operation of one of the devices at a particular partial stroke.

2. Governing system comprising a first and a second speed governor having consecutive non-overlapping speed ranges, an element for controlling a machine in response to speed changes, means including a link and lever mechanism for connecting the governors to the element, the link and lever mechanism having a leverage sufficient to effect movement of the element through its entire operating range in response to movement of one of the governors through any one of several consecutive parts of its operating range, and means for adjusting the lever mechanism to effect operation of one of the governors within a predetermined part of its operating range.

3. The combination with an element for controlling a machine of a governing mechanism for the element comprising a speed governor for operation at a low speed range, another speed governor for operation at a high speed range, a first lever, means pivotally connecting the governors to separate points of the lever, and a mechanism including a second lever pivotally connected to the first lever for moving the element in response to speed changes, a fulcrum for the second lever, and means for adjusting the fulcrum, the leverage between each governor and the element being dimensioned to cause movement of the element through its full operating range within a part of the total movement of each governor and the last named means permitting selection of a plurality of parts of the total movement of each governor to move the element through its full operating range.

REED J. CAUGHEY.